A. STEWART.

Fruit Cans.

No. 5,968. Reissued July 14, 1874.

Attest

W. M. Shubert

Edgar J. Gross

Inventor

Alexander Stewart

By F. Millward

Attorney

THE GRAPHIC CO. PHOTO-LITH. 39 & 41 PARK PLACE, N.Y.

UNITED STATES PATENT OFFICE.

ALEXANDER STEWART, OF CINCINNATI, OHIO.

IMPROVEMENT IN FRUIT-CANS.

Specification forming part of Letters Patent No. 58,502, dated October 2, 1866; reissue No. 5,968, dated July 14, 1874; application filed July 1, 1874.

*To all whom it may concern:*

Be it known that I, ALEXANDER STEWART, of Cincinnati, Hamilton county, State of Ohio, have invented certain new and useful Improvements in Tops for Fruit-Cans, of which the following is a specification:

My invention relates to the class of devices by which an outside trough is formed upon the body of a fruit-can, to receive sealing material, into which the downwardly-turned edge of the cover is to be embedded for the purpose of sealing the contents of the can; and my invention consists in a peculiar construction of the trough by which, in the first place, the sealing material is contained wholly in the trough without contact with the side of the can, or connection with the joint between the trough and body of the can, and by which, in the second place, it is so formed as to tightly embrace the body of the can, so that the body of the can is stiffened thereby, and the trough is not liable to be displaced while the joint between it and the body of the can is soldered; and by which, in the third place, it is so formed at the outer edge of the trough, as to materially stiffen the trough at this exposed edge and prevent accidental indentations. The peculiar construction by which these advantages are obtained will be hereinafter described.

Figure 1:
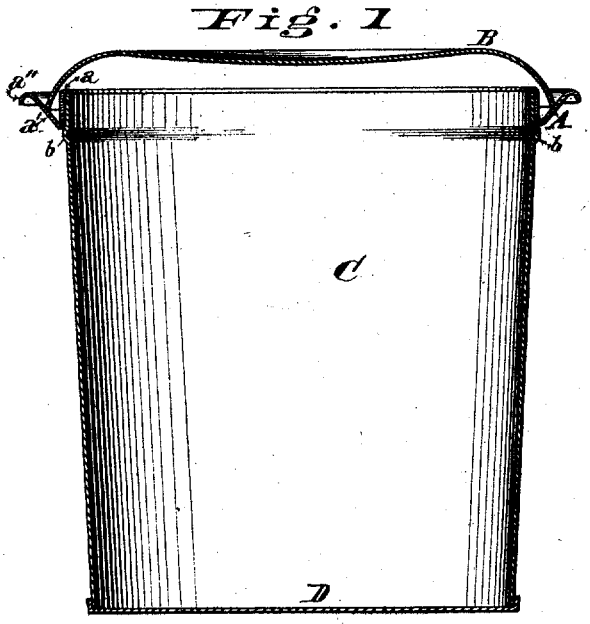
Figure 2:
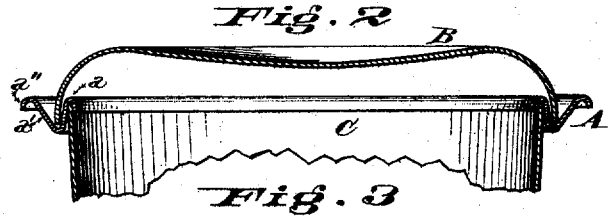
Figure 3:
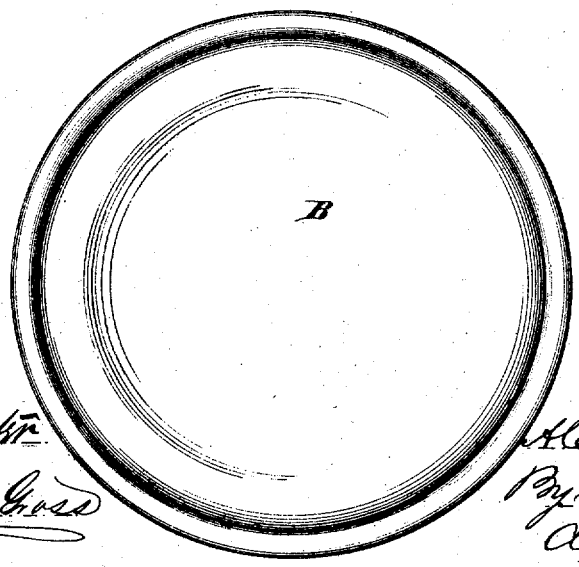

Figure 1 is a vertical section of a fruit-can, with my improved trough and top applied thereto, the view being taken in the plane of the line *x x*, Fig. 3. Fig. 2 is a similar section of the upper part of the can, showing a modified form of a trough applied thereto. Fig. 3 is a plan or top view of the can, with the cover in place.

A is the trough, B the cover, C the body of the can, and D the bottom thereof. The can, as shown, is made tapering, for convenience in shipment, the tapering form enabling the packing of the cans one inside of the other, or others. The covers B, in shipment, are packed separately and so also are the troughs, the latter being connected to the body of the can after arriving at their destination. The trough A and the bottom D are made from the same piece of metal, the tapering character of the body of the can permitting the center of the piece of tin from which the trough is cut to be used as the bottom of the can. To construct the trough A and bottom B, a flat piece of metal of the proper shape and size is taken, and from its center is removed a piece which is afterward used for making the bottom D of the can. The annular rim thus left, is then spun, stamped, or swaged in a form approaching the letter V. The preferred form, as shown in Fig. 1, is composed of a vertical side, *a*, conical side, *a'*, and curved exterior rim *a''*. The vertical side *a* is made to so tightly embrace the body of the can as to materially stiffen the same, this side forming, with the part of the can adjacent thereto, a double thickness of metal, as shown, by which great strength is given to this upper edge of the can. The close connection, also, between this vertical side and the body of the can serves, when the trough is forced into place, to firmly secure it against its displacement while being soldered. The lower edge of the V-shaped trough may rest upon a slightly-projecting bead, *b*, formed on the body of the can. This bead serves to preclude the contingency of the rim or trough A slipping down while being soldered. The upper edge of the vertical side *a* may be slightly turned in, as shown in Fig. 1, to give additional stiffening to the upper edge of the can, or it may, for the same purpose, be turned entirely over the edge, as shown in Fig. 2. The space between the conical side *a'* and the vertical side *a* forms the trough into which the sealing material is poured; and the exterior rim *a''*, by reason of its peculiar formation, serves to greatly stiffen this trough at its exposed edge, so as to render the trough proof against accidental indentation or damage. The cover B is made by swaging, stamping, or forming a piece of metal of the proper size into the shape shown in Figs. 1 and 2—that is, with a somewhat concave upper face and an outer edge turned down all round, so that it will rest on the V-shaped trough A. After the rim or trough A has been applied to the can in the manner shown, and the cover or cap B is placed thereon, the wax or other sealing medium is pressed or poured into the trough, thus hermetically sealing the can and the contents thereof.

I claim—

A rim or trough, A, for a metal fruit-can, having its inner side constructed to tightly embrace the exterior of the body of the can, and its outer edge formed into a bead, $a''$, for stiffening purposes, substantially in the manner and for the purpose specified.

In testimony whereof I have hereunto set my hand.

ALEXANDER STEWART.

Witnesses:

EDGAR J. GRASS,

F. MILLWARD.